(12) United States Patent
White et al.

(10) Patent No.: US 8,548,145 B2
(45) Date of Patent: *Oct. 1, 2013

(54) SYSTEM AND METHOD FOR CALL HANDLING

(75) Inventors: Scott White, Austin, TX (US); James Cansler, Pflugerville, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,674

(22) Filed: Jun. 19, 2012

(65) Prior Publication Data

US 2012/0257737 A1 Oct. 11, 2012

Related U.S. Application Data

(63) Continuation of application No. 12/021,702, filed on Jan. 29, 2008, now Pat. No. 8,223,941.

(51) Int. Cl.
*H04M 3/42* (2006.01)
*H04W 24/00* (2009.01)

(52) U.S. Cl.
USPC ............ 379/201.1; 379/201.02; 379/201.06; 379/201.07; 379/201.08; 455/456.1

(58) Field of Classification Search
USPC ............ 379/201.01, 201.02, 201.06–201.1; 455/456.1–456.3
See application file for complete search history.

(56) References Cited

U.S. PATENT DOCUMENTS

| | | | |
|---|---|---|---|
| 7,162,237 B1 | 1/2007 | Silver et al. | |
| 8,223,941 B2 * | 7/2012 | White et al. | 379/201.1 |
| 2002/0076010 A1 | 6/2002 | Sahai | |
| 2002/0097856 A1 | 7/2002 | Wullert | |
| 2002/0181672 A1 | 12/2002 | Cannell | |
| 2003/0112952 A1 | 6/2003 | Brown et al. | |
| 2004/0198461 A1 | 10/2004 | Coombes | |
| 2005/0027867 A1 | 2/2005 | Mueller et al. | |
| 2005/0141687 A1 | 6/2005 | Ozugur et al. | |
| 2006/0187847 A1 * | 8/2006 | Pelton et al. | 370/252 |
| 2007/0032226 A1 | 2/2007 | Link et al. | |
| 2008/0008300 A1 | 1/2008 | Brandt et al. | |
| 2008/0198839 A1 * | 8/2008 | Ku et al. | 370/352 |
| 2009/0046842 A1 * | 2/2009 | Allen et al. | 379/201.01 |
| 2010/0128857 A1 * | 5/2010 | Logan | 379/88.22 |

* cited by examiner

*Primary Examiner* — Harry Hong
(74) *Attorney, Agent, or Firm* — Guntin & Gust, PLC; Jay H. Anderson

(57) ABSTRACT

A system that incorporates teachings of the present disclosure may include, for example, a call processing element in a communication system having a controller to detect an incoming call directed to a called party, retrieve presence information associated with a plurality of communication devices of the called party, retrieve presence information of a calling party initiating the incoming call, and determine from the presence information of the called party, the presence information of the calling party, and a call processing profile of the called party how to respond to the incoming call. Other embodiments are disclosed.

20 Claims, 7 Drawing Sheets

100

200

SYSTEM AND METHOD FOR CALL HANDLING

CROSS-REFERENCE TO RELATED APPLICATIONS

This application is a continuation of U.S. patent application Ser. No. 12/021,702 filed Jan. 29, 2008, which is incorporated herein by reference in its entirety.

FIELD OF THE DISCLOSURE

The present disclosure relates generally to call handling techniques and more specifically to a system and method for call handling.

BACKGROUND

Voicemail services have provided a means for informing a calling party that a called party is unavailable to accept a call as well as a means for recording messages of the calling party for later retrieval by the called party. Typically a called party does not answer an incoming call because s/he is busy with a task, or is in the midst of an activity or in a location in which answering the call would interrupt others in the vicinity.

DETAILED DESCRIPTION

One embodiment of the present disclosure entails a call processing element in a communication system having a controller to detect an incoming call directed to a called party, retrieve presence information associated with a plurality of communication devices of the called party, retrieve presence information of a calling party initiating the incoming call, and determine from the presence information of the called party, the presence information of the calling party, and a call processing profile of the called party how to respond to the incoming call.

Another embodiment of the present disclosure entails a computer-readable storage medium having computer instructions for processing an incoming call directed to a called party according to presence information associated with the called party, presence information associated with a calling party initiating the incoming call, and a call processing profile of the called party.

Yet another embodiment of the present disclosure entails a presence system having a controller to supply a call processing element presence information associated with a plurality of communication devices of a called party, wherein the call processing element processes incoming calls directed to the called party according to the presence information of the called party, presence information of a calling party initiating the incoming call, and a call processing profile of the called party.

Another embodiment of the present disclosure entails a method involving processing an incoming call directed to a called party according to presence information of the called party, presence information of a calling party initiating the incoming call, and a call processing profile of the called party.

Figure 1:
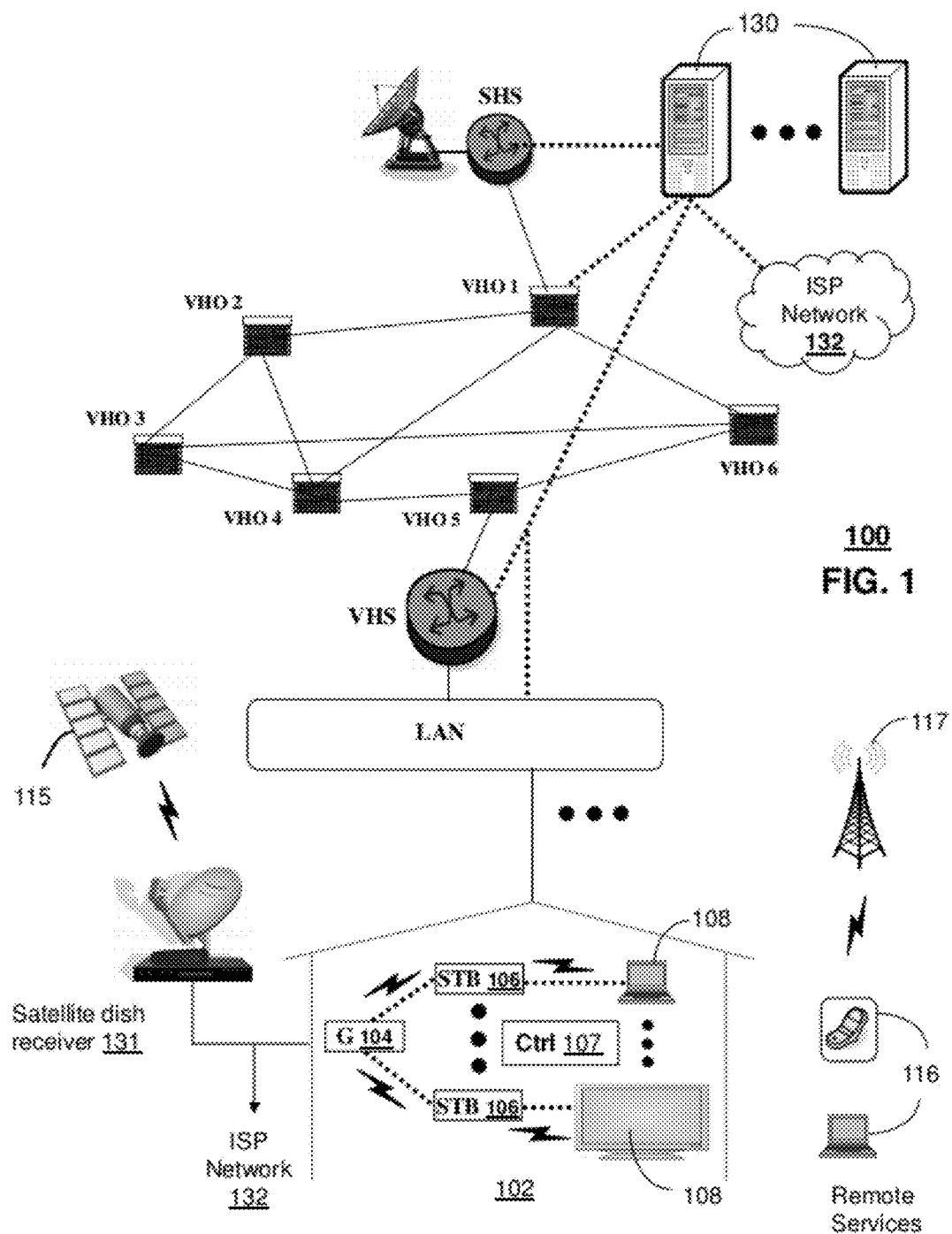
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a voicemail system (referred to herein as voicemail system 131) for recording voicemail messages directed to a called party of communication system 100.

Another distinct portion of the one or more computing devices 130 can be used as a presence system (referred to herein as presence system 133). The presence system 133 can utilize common computing technology to monitor a plurality of communication devices of a subscriber of communication system 100 (e.g., cell phone, home phone, office phone, home computer, office computer, STB, and so on) by way of the network elements of communication system 100. The presence system 133 can for example monitor communication activities of the ISP network 132 to determine whether a subscriber of the communication system 100 is utilizing an office or home computer. The presence system 133 can also monitor whether the subscriber is utilizing a cellular phone by monitoring the subscribers location. In this embodiment, the presence system 133 can monitor that the cellular phone is transitioning between cellular base stations 117, which can indicate that the subscriber is in transit (traveling in a car, or train). Alternatively, or in combination, the presence system 133 can request location coordinates from a cellular phone incorporating a Global Positioning System (GPS) receiver. Similarly, the presence system 133 can monitor network elements of communication system 100 to detect that the subscriber has downloaded a VoD movie and is presently viewing the movie. Generally speaking, the presence system 133 can be programmed to monitor the location and activities of a subscriber of the communication system by monitoring the use of the subscriber's available communication devices in communication system 100.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
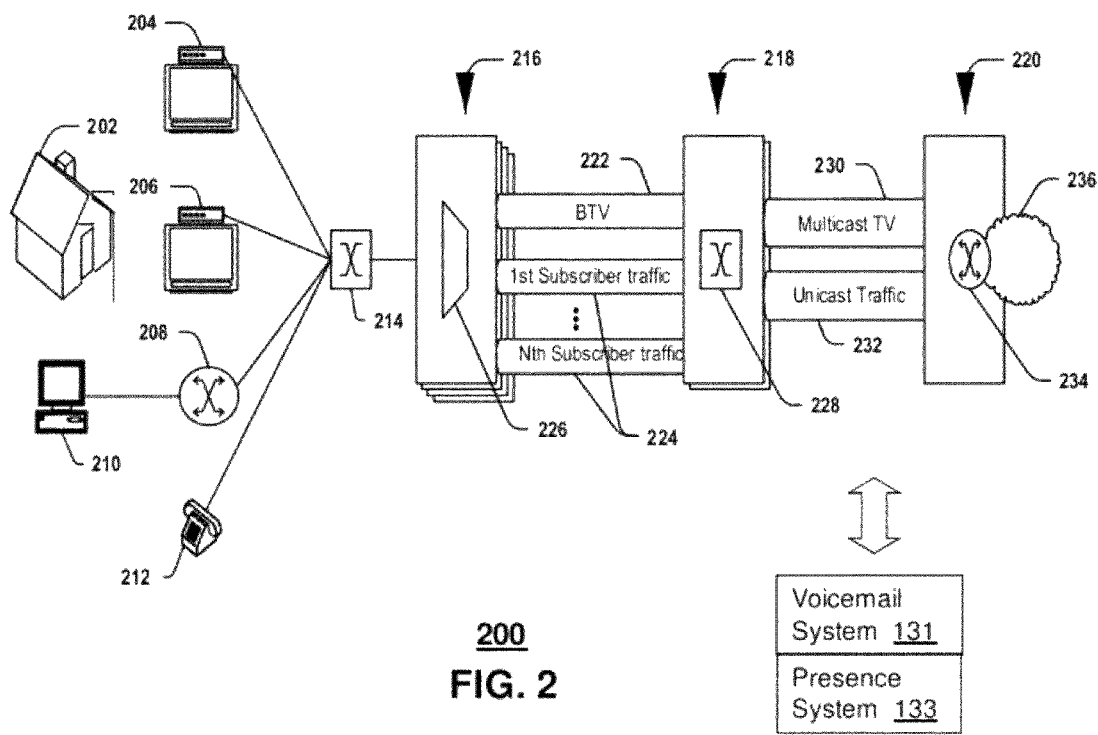

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a (DSLAM). The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The voicemail system 131 and presence system 133 of FIG. 1 can be operably coupled to the second communication system 200 for purposes of recording voicemail messages and monitoring the activities of a subscriber of the second communication system.

Figure 3:
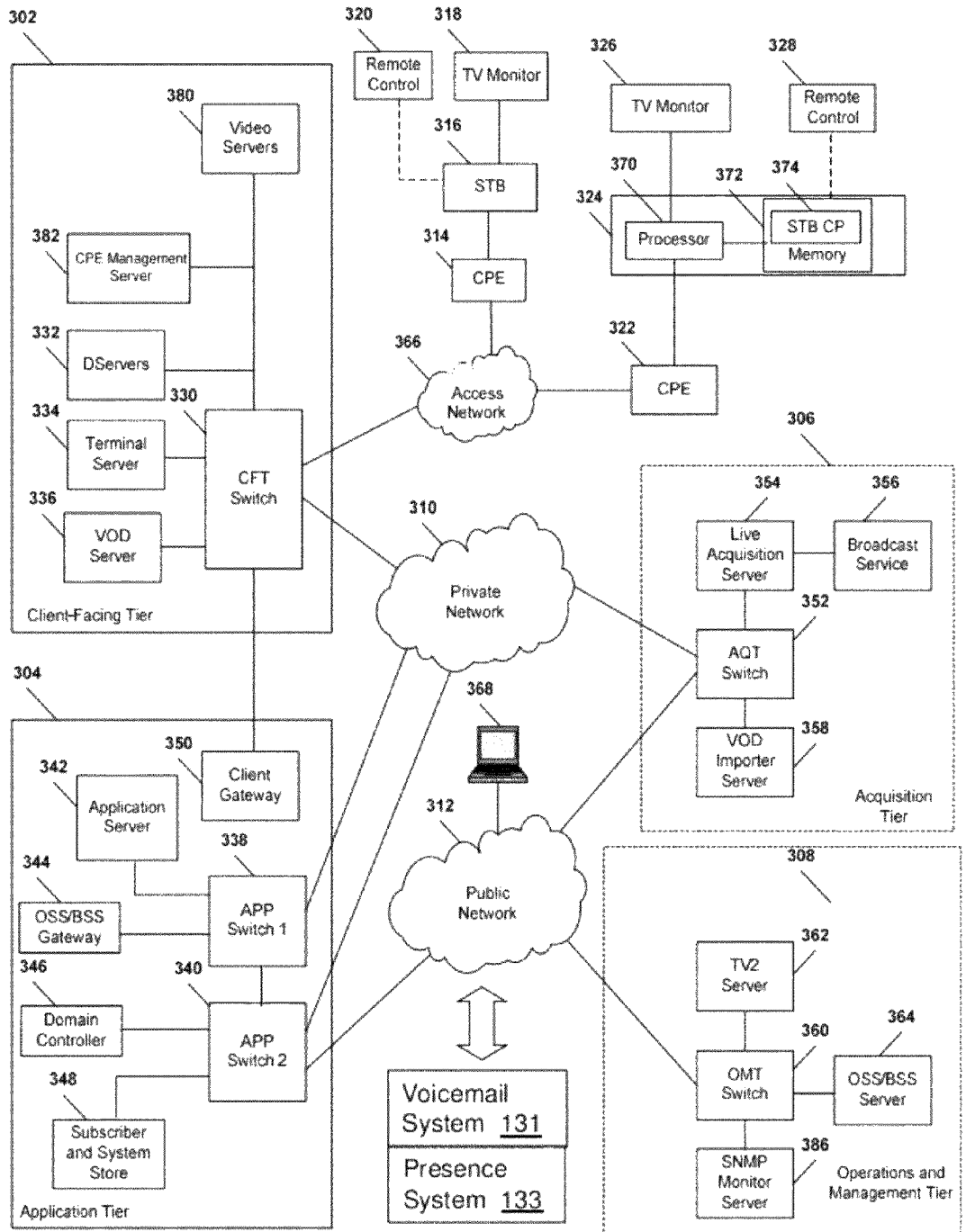

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite headend office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The voicemail system 131 and presence system 133 of FIGS. 1-2 can be operably coupled to the second communication system 200 for purposes of recording voicemail messages and monitoring the activities of a subscriber of the second communication system.

It should be apparent to one of ordinary skill in the art from the foregoing media communication system embodiments that other suitable media communication systems for distributing broadcast media content as well as peer-to-peer exchange of content can be applied to the present disclosure.

Figure 4:
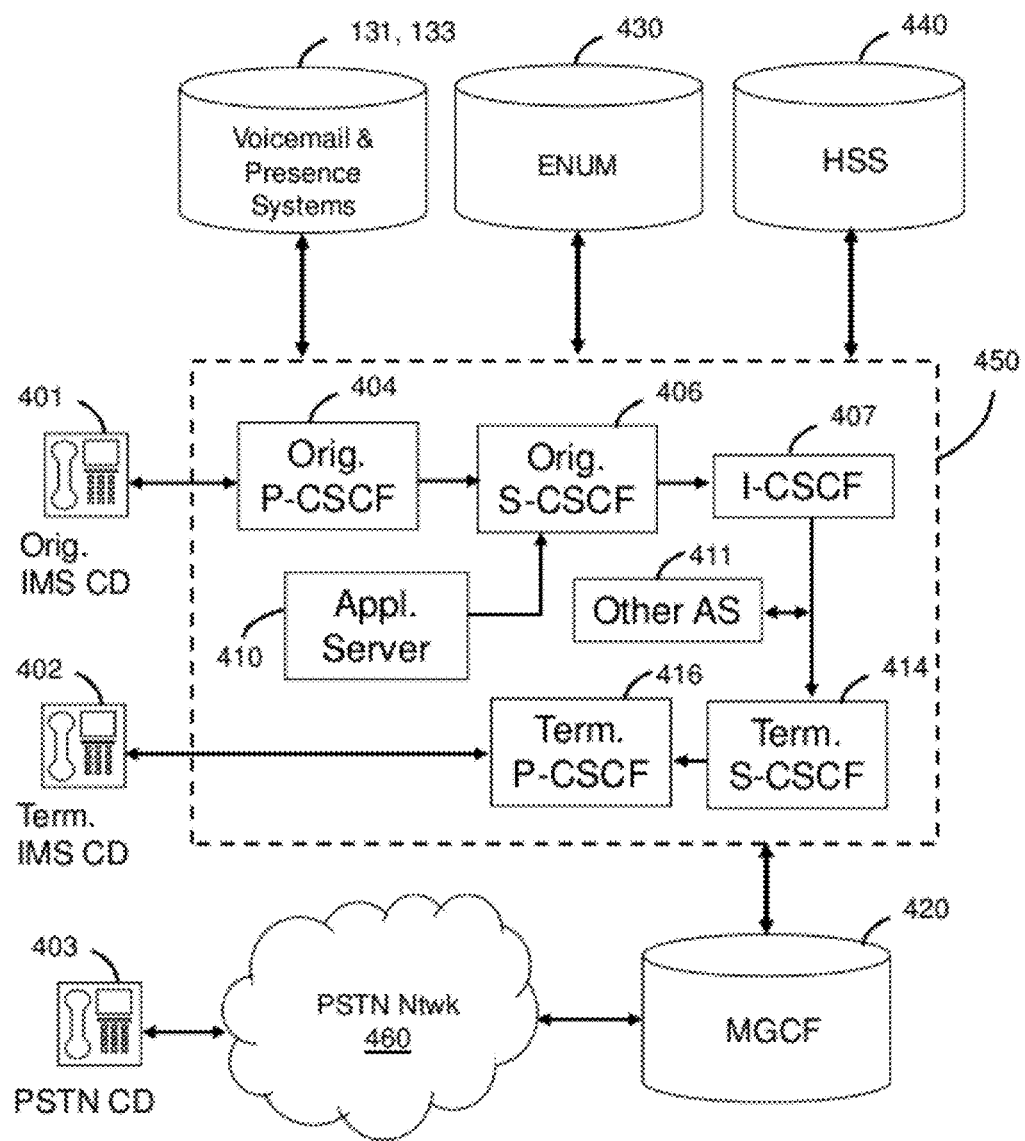

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 115 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (not shown).

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the voicemail system 131 and presence system 133 previously discussed for FIGS. 1-3. In this representative embodiment, the voicemail system 131 and presence system 133 can be accessed over a PSTN or VOID channel of communication system 400 by common techniques such as described above.

Figure 5:
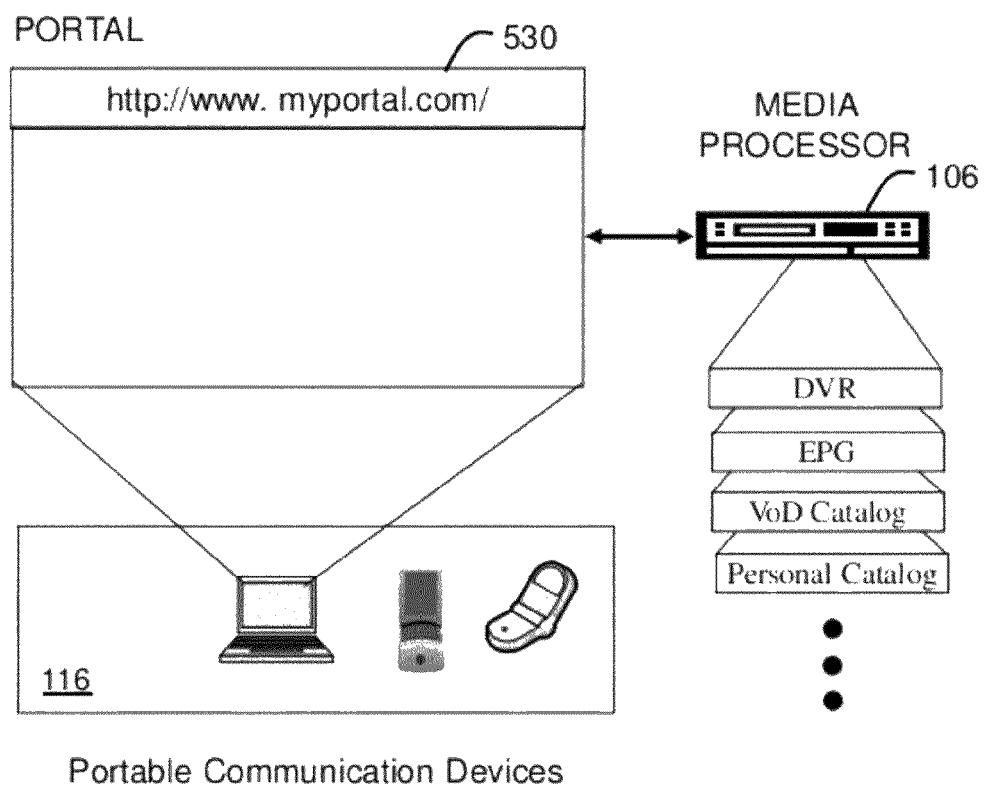
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on. The portal 530 can further be used to configure a call processing element of FIGS. 1-4 for establishing call processing profiles of subscribers of said communication systems.

Figure 6:
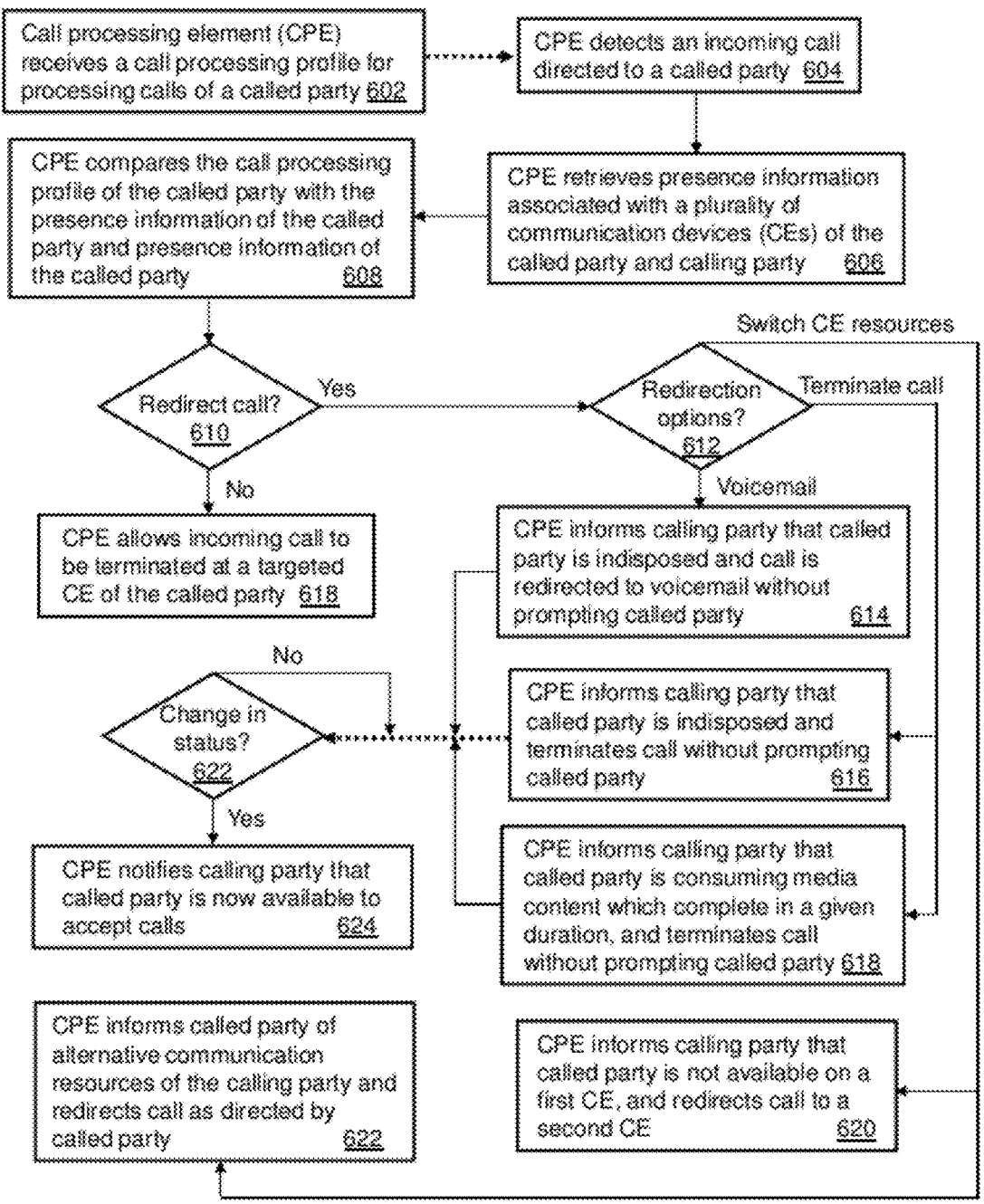
FIG. 6 depicts an exemplary method operating in portions of the communication systems of FIGS. 1-4.

FIG. 6 depicts an exemplary method 600 operating in portions of communication systems 100-400. For illustrative purposes, communication systems 100-400 will be referred to as communication system 100. In this context, communication system 100 can represent the communication systems of FIGS. 1-4 singly or in any combination. With this in mind, method 600 begins with step 602 in which a call processing element (CPE) in communication system 100 receives a call processing profile for processing calls directed to a subscriber of communication system 100 ("called party"). The CPE can represent one or more network elements of communication system 100 previously described in FIGS. 1-4 that can be programmed to perform the functions of method 600.

The call processing profile can be constructed by the subscriber using portal 530. The portal 530 can present the subscriber for example a graphical user interface to define call processing preferences. The call processing preferences can be based on the location of the subscriber, an activity which the subscriber is engaged in, one or more alternative communication resources of a calling party initiating a call to the subscriber which can be identified by presence information of the calling party, and/or an identity of the calling party. With the call processing profile, the subscriber can for instance identify a list of locations where the subscriber does not want to receive calls. Examples of these locations may include religious institutions (e.g., churches, mosques, synagogues), theaters, libraries, and so on. The subscriber can also define in the call processing profile that some activities of the subscriber should not be interrupted (e.g., watching a VoD movie, communicating with a family member over a phone call, engaged in a conference room meeting with business associates, etc.).

The subscriber can override these settings for example by identifying certain callers which should always be given access to the communication devices of the subscriber (e.g., spouse, children, boss, etc.). The subscriber can also define in the call processing profile redirection of incoming calls to alternative communication resources of the calling party. For example, an incoming call can be redirected from a voice communication session to an instant messaging, SMS, MMS, or email communication session available to the calling party and the called party. Similarly, the subscriber can define an exclusion list of callers who should be redirected to voicemail always or when the subscriber is engaged in certain activities.

From these illustrations it should be apparent that the call processing profile of a subscriber can be used to define any number of conditional statements for processing calls based on the presence information of the called party and/or the presence information of the calling party.

Step 602 represents a configuration or provisioning step (as depicted by the dashed line) which can be performed independently of steps 604-624 which represent a run-time method for processing incoming calls directed to the subscriber.

With this in mind, a CPE of communication system 100 can be programmed to monitor incoming calls directed to a subscriber (for illustrations purposes a called party). When an incoming call is detected in step 604, the CPE proceeds to step 606 where it retrieves from the presence system 133 presence information associated with a plurality of communication devices of the called party and the calling party. The communication devices of the called party or calling party can represent any of the communication devices depicted in FIGS. 1-4 (e.g., a cell phone, a wireline phone, an STB, a DVR, a laptop computer, etc.) and other communication devices which can be operably coupled to the communications systems of FIGS. 1-4 which have not be mentioned in the present disclosure. As noted earlier, the presence information associated with the communication devices of the called party can indicate at least one among the location of the called party and one or more activities which the called party is engaged in.

The presence information of the calling party can come from the same presence system 133 used by the called party or a similar system which is accessible to the CPE. The presence information of the calling party can indicate among other things the location of the calling party, the activities of the calling party, and the alternative communication resources available to the calling party. Alternative communication resources can include for example other communication devices available to the calling party other than the one being used at the time the incoming call was initiated by the calling party (e.g., laptop computer, home phone, office phone, etc.). The alternative communication resources can also represent the communication resources available in the same communication device from which the call was initiated (e.g., SMS messaging, MMS messaging, instant messaging, email messaging, and so on).

In step 608 the CPE can compare the presence information of the called party and the presence information of the calling party to the call processing profile to determine in step 610 whether the call should be redirected away from the communication device of the called party targeted by the incoming call. For example, if the presence information of the called party indicates from location coordinates provided in the presence information of the called party that the called party is in a religious institution, the call processing profile can direct the CPE to redirect the call by proceeding to step 612. If however the call processing profile provides exceptions for redirection based on a caller identification (caller ID) retrieved from signaling information in the incoming call (e.g., spouse), and the CPE detects that the calling party matches the exception, then the CPE can proceed to step 618 where it allows the incoming call to be terminated at the targeted communication device of the called party under a typical call processing cycle.

If the call is to be redirected, the CPE can determine in step 612 which redirection option is to be chosen according to the conditional statements established by the called party's call processing profile. Depending on the preferences established by the call processing profile, the CPE can be directed in one illustrative embodiment to inform the calling party in step 614 that the called party is indisposed (e.g., "the party you are trying to reach is in a synagogue") and redirect the incoming call to the voicemail system 131 ("please leave a message") without prompting a ring tone of the communication device of the called party to avoid disturbing the called party or others in the vicinity of the called party. This embodiment can be useful in situations where privacy and discretion are important to the called party. The voicemail system 131 can record a voicemail message supplied by the calling party, and can later notify the called party discreetly that a voicemail message is available with a stealth alert (e.g., vibration of the communication device, flashing light, or otherwise).

In another embodiment, the CPE can be directed to inform in step 616 the calling party that the called party is indisposed ("the party you are trying to reach is busy") and terminate the call ("please call later") without recording a voicemail message or prompting the communication device of the called party. The type of message presented to the calling party can be determined by the call processing profile. For example, for important callers, the message can be more descriptive of what the called party is engaged in, while for less important calling parties the message can be more private and vague.

In yet another embodiment, the CPE can be directed to inform the calling party in step 618 that the called party is in the midst of consuming media content (e.g., "the party you are trying to reach is busy watching a movie. She can be reached in 45 minutes. Please call later. Thank you."), and thereafter terminates the call. The CPE can make this determination from presence information which the presence system 133 can derive from monitoring the media communication systems of FIGS. 1-3 (e.g., STB, DVR, etc.).

In another embodiment, the CPE can be directed to inform the calling party in step 620 that the communication device of the called party targeted by the incoming call is not in use, and automatically redirects the call to another communication device of the called party which the CPE determines the called party can answer based on the presence information of the called party retrieved in step 606 and its comparison to the call processing profile. In another illustrative embodiment, the CPE can inform the calling party that the CPE can either redirect the call to voicemail or the other communication device of the called party, and redirect the call according to a choice made by the calling party.

Under circumstances in which the call is redirected to one of steps 614-618, the CPE can also be programmed to monitor in step 622 as a background process (represented by the dashed line) when the called party becomes available to take calls from the calling party that was previously prevented from completing the call. When a change in status is detected in step 622 based on a comparison of updated presence information of the called party and the conditions set forth in the call processing profile, the CPE can proceed to step 624 where it proactively notifies the calling party that the called party is now available to accept calls. The notification can be sent by email, a recorded message transmitted in synthetic speech to the calling party according to the previous caller ID used, or any other form of suitable communication technique that can accomplish a delivery of the notification. The notification can also be directed according to the presence information of the calling party (e.g., the most likely device of the calling party to receive the notification). Analyzing presence information of the calling party to direct the notification can be useful in instances where the lapse of time between the call initiated by the calling party and the change in status of the called party is significant.

In yet another illustrative embodiment, the incoming call can be redirected according to step 622. In this step, a notification can be sent discretely to a communication device of the called party (e.g., IM message) when it is determined according to conditional statements in the call processing profile that the called party should not be interrupted with a voice call, but an attempt should be made to contact the called party discretely based on the caller ID of the calling party. The notification can inform the called party of the alternative communication resources available to the calling party (e.g., IM, email, SMS, MMS, etc.). The called party can decide to redirect the call to the voicemail system 131. Alternatively, the called party can respond to the call discretely by requesting that the CPE redirect the call to the calling party's IM device, which may be the same communication device that the calling party is presently using or another communication device available to the calling party (e.g., laptop computer).

In this embodiment, the called party can communicate with the calling party via an IM session. The calling party can respond by way of an IM response message, or the communication device of the calling party or the CPE can perform a translation such voice to IM synthesis, and IM to voice synthesis. That is, the calling party hears synthesized voice corresponding to an IM message submitted by the called party, and the calling responds with voice which is synthesized into an IM text message transmitted to the called party.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted so that call redirection occurs without providing information to the calling party as to why the call is being redirected. In yet another illustrative embodiment, method 600 can be adapted so that the CPE presents the calling party a selectable option to be notified when the called party is available to receive calls rather than assume the calling party desires such notification. In yet another illustrative embodiment, method 600 can be adapted so that step 622 invokes alternative communication sessions without prompting the called party for a preferred choice. The preferred choice can be identified in the call processing profile of the calling party.

Other suitable modifications can be applied to the present disclosure without departing from the scope of the claims below. Accordingly, the reader is directed to the claims section for a fuller understanding of the breadth and scope of the present disclosure.

Figure 7:
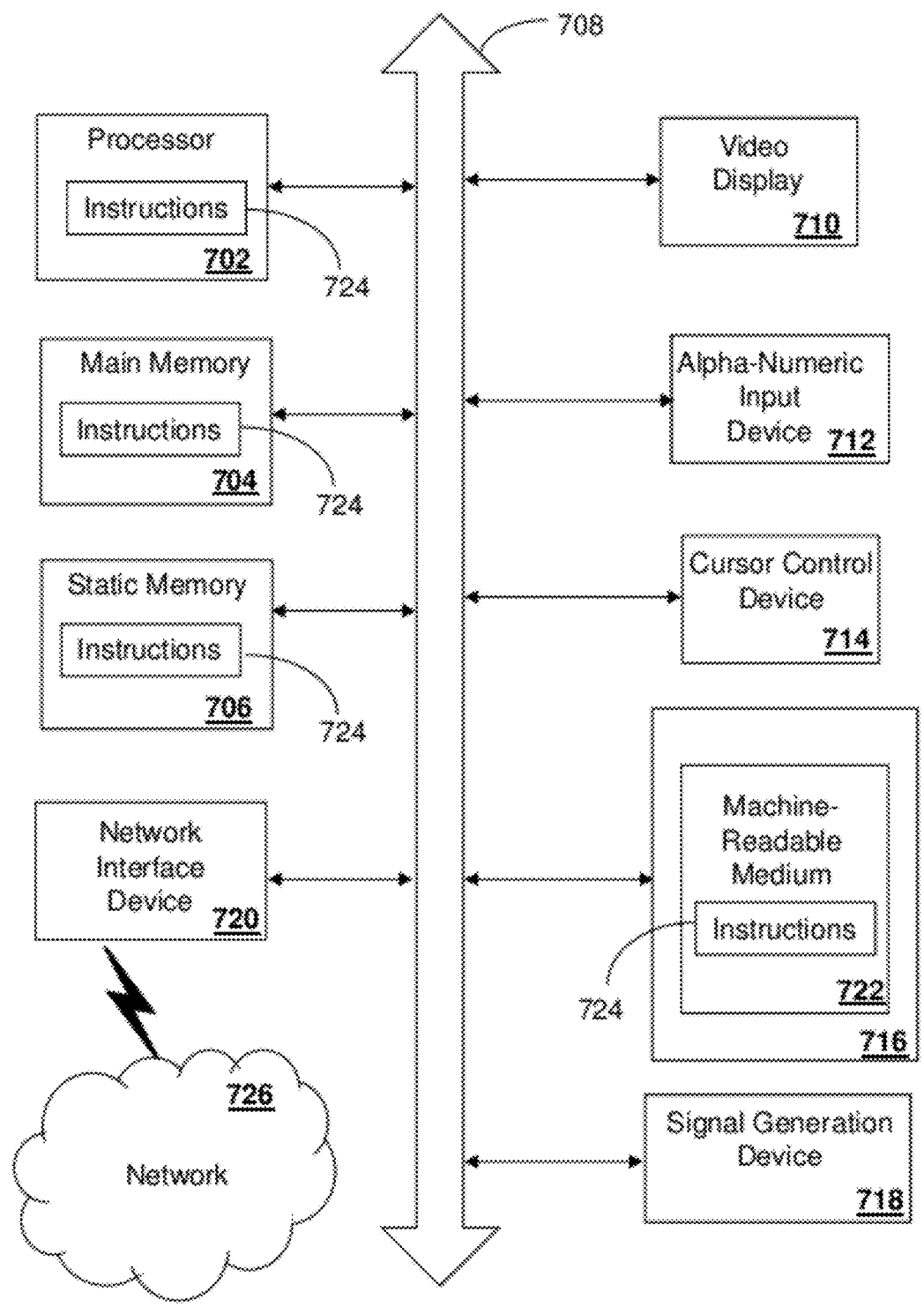
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a memory to store computer instructions; and
   a controller coupled to the memory, wherein execution of the computer instructions by the controller causes the controller to perform operations, comprising:
   detecting an incoming call directed to the device, wherein the device is utilized by a called party;
   retrieving first presence information associated with the called party;
   determining a location of the called party from the first presence information;
   retrieving second presence information associated with a calling party that initiated the incoming call; and
   responding to the incoming call according to the first presence information of the called party, the second presence information of the calling party, and a call processing profile associated with the called party, wherein the responding further comprises:
      determining from the location and the call processing profile that the called party is indisposed to answer the incoming call;
      determining from the second presence information of the calling party an alternative communication resource available to the calling party; and
      initiating an outgoing call according to the determined alternative communication resource available to the calling party.

2. The device of claim 1, wherein the location of the called party is determined from location coordinates provided in the first presence information, wherein the first presence information of the called party is supplied by a presence system that monitors a plurality of communication devices of the called party.

3. The device of claim 1, wherein execution of the computer instructions causes the controller to perform operations comprising redirecting the incoming call to a voicemail system responsive to determining from the first presence information that the called party is indisposed to accept the incoming call.

4. The device of claim 3, wherein execution of the computer instructions causes the controller to perform operations comprising transmitting to a communication device of the calling party a message providing a reason why the incoming call is being redirected to the voicemail system.

5. The device of claim 1, wherein execution of the computer instructions causes the controller to perform operations comprising transmitting to a communication device of the calling party a message indicating a status of the called party.

6. The device of claim 1, wherein execution of the computer instructions causes the controller to perform operations comprising preventing the incoming call from initiating an audible alert at a communication device of the called party.

7. The device of claim 5, wherein execution of the computer instructions causes the controller to perform operations comprising:
   detecting a change in the status of the called party, wherein the change in the status indicates the called party is available to answer incoming calls, and wherein the change in the status is determined from an update in the first presence information of the called party and a comparison of the updated first presence information to the call processing profile of the called party; and transmitting a notice to a communication device of the calling party indicating the called party is available to receive incoming calls responsive to the detected change in the status.

8. The device of claim 1, wherein execution of the computer instructions causes the controller to perform operations comprising:

determining from the first presence information of the called party that the incoming call is directed to a first communication device of the called party which is not in use by the called party; and determining that the called party is available to answer incoming calls on a second communication device of the called party according to the first presence information of the called party.

9. The device of claim 8, wherein execution of the computer instructions causes the controller to perform operations comprising redirecting the incoming call to the second communication device of the called party without initiating an audible alert at the first communication device.

10. The device of claim 1, wherein execution of the computer instructions causes the controller to perform operations comprising receiving from a communication device of the called party the call processing profile.

11. The device of claim 1, wherein the device operates in a packet-switched communication system.

12. A non-transitory computer-readable storage device, comprising instructions, which responsive to being executed by a processor, cause the processor to perform operations comprising:

detecting an incoming call directed to a communication device of a called party; and processing the incoming call according to first presence information associated with the called party, second presence information associated with a calling party that initiated the incoming call, and a call processing profile of the called party;

determining a location of the called party from the first presence information;

determining from the location and the call processing profile that the called party is indisposed to answer the incoming call;

submitting a message to the communication device of the called party identifying an alternative communication resource available to the calling party;

receiving a request from the communication device of the called party to facilitate establishment of communications with the alternative communication resource of the calling party; and facilitating establishment of communications between the alternative communication resource of the calling party and the communication device of the called party.

13. The non-transitory computer-readable storage device of claim 12, wherein the operations further comprise:

retrieving the first presence information of the called party from a first presence system; and retrieving the second presence information of the calling party from a second presence system.

14. A device, comprising:
a memory to store computer instructions; and
a controller coupled to the memory, wherein execution of the computer instructions by the controller causes the controller to perform operations, comprising:

detecting an incoming call directed to the device, wherein the device is utilized by a called party;

retrieving first presence information associated with the called party;

detecting from the first presence information of the called party that a communication device of the called party is presenting media content;

determining a duration for completing the presentation of the media content;

retrieving second presence information associated with a calling party that initiated the incoming call; and responding to the incoming call according to the first presence information of the called party, the second presence information of the calling party, the determined duration, and a call processing profile associated with the called party.

15. The device of claim 14, wherein the operations further comprise determining a location of the called party from location coordinates provided in the first presence information, wherein the first presence information of the called party is supplied by a presence system that monitors a plurality of communication devices of the called party.

16. The device of claim 14, wherein the operations further comprise transmitting to a communication device of the calling party a message indicating a status of the called party.

17. The device of claim 14, wherein the operations further comprise preventing the incoming call from initiating an audible alert at the communication device of the called party.

18. The device of claim 16, wherein the operations further comprise:

detecting a change in the status of the called party, wherein the change in the status indicates the called party is available to answer incoming calls, and wherein the change in the status is determined from an update in the first presence information of the called party and a comparison of the updated first presence information to the call processing profile of the called party; and transmitting a notice to the communication device of the calling party indicating the called party is available to receive incoming calls responsive to the detected change in the status.

19. The device of claim 14, wherein the operations further comprise:

determining from the first presence information of the called party that the incoming call is directed to a first communication device of the called party which is not in use by the called party; and determining that the called party is available to answer incoming calls on a second communication device of the called party according to the first presence information of the called party.

20. The device of claim 19, wherein the operations further comprise redirecting the incoming call to the second communication device of the called party without initiating an audible alert at the first communication device of the called party.

* * * * *